(12) United States Patent
Chang

(10) Patent No.: US 6,408,659 B1
(45) Date of Patent: Jun. 25, 2002

(54) QUICK LOCK

(75) Inventor: Chin-Shu Chang, Chang Hua (TW)

(73) Assignee: Handyway Co., Ltd., Chang Hua (TW)

( * ) Notice: Subject to any disclaimer, the term of this patent is extended or adjusted under 35 U.S.C. 154(b) by 0 days.

(21) Appl. No.: 09/729,726

(22) Filed: Dec. 6, 2000

(51) Int. Cl.[7] ................................................ B62H 5/06
(52) U.S. Cl. .............................. 70/19; 70/233; 70/225
(58) Field of Search ........................... 70/19, 225, 233; 301/110.5; 403/322.4, 315, 316, 254

(56) References Cited

U.S. PATENT DOCUMENTS

| | | | | |
|---|---|---|---|---|
| 1,156,739 A | * | 10/1915 | Backus ....................... 70/19 X |
| 1,346,964 A | * | 7/1920 | Johnson ....................... 70/233 |
| 1,851,313 A | * | 3/1932 | Johnson ................... 70/233 X |
| 4,114,409 A | * | 9/1978 | Scire ....................... 70/233 X |
| 4,366,683 A | * | 1/1983 | Labbe et al. ................... 70/19 |
| 4,621,873 A | * | 11/1986 | Weinstein et al. ......... 70/233 X |
| 4,724,692 A | * | 2/1988 | Turin et al. .................... 70/225 |
| 5,022,672 A | * | 6/1991 | Kawai ....................... 70/233 X |
| 5,027,628 A | * | 7/1991 | DeRocher et al. ............. 70/233 |
| 5,118,125 A | * | 6/1992 | Plunkett ................... 70/233 X |
| 5,291,763 A | * | 3/1994 | Cuisinot ................... 70/233 X |
| 5,479,836 A | * | 1/1996 | Chang ....................... 70/233 X |
| 5,526,661 A | * | 6/1996 | Lin .............................. 70/233 |
| 5,813,258 A | * | 9/1998 | Cova et al. ................... 70/225 |
| 5,865,560 A | * | 2/1999 | Mercat et al. ........... 403/322.4 |
| 6,004,064 A | * | 12/1999 | Franz ....................... 403/322.4 |
| 6,167,735 B1 | * | 1/2001 | Brown ........................... 70/19 |
| 6,202,458 B1 | * | 3/2001 | Buchalter ..................... 70/233 |
| 6,283,310 B1 | * | 9/2001 | Dean et al. .................... 211/20 |

* cited by examiner

Primary Examiner—Suzanne Dino Barrett
(74) Attorney, Agent, or Firm—Rosenberg, Klein & Lee

(57) ABSTRACT

A lock comprises a shell including an axial hole, a radial hole in communication with the axial hole, and a threaded section on the radial hole; a handle mechanism including a recess in the lower portion for pivotably receiving the shell, a groove in the bottom in communication with the recess, a side hole in communication with the radial hole and the recess, and a pin fixed in a side aperture; a slidable adjusting bar in the radial hole, the adjusting bar including an upper end, a lower end, and an annular groove in the central portion; a body secured in the axial hole, the body including a keyhole on one end, a rotatable lock mechanism on the other end, and a rotatable stud on the lock mechanism capable of being activated to move into or retract from the annular groove; and a cylinder including an upper threaded section threadedly secured to the threaded section of the shell, a lower section for fastening two work pieces, and a top hole for receiving the lower end of adjusting bar. The fastening/unfastening of work pieces can be done quickly by turning the lock.

1 Claim, 4 Drawing Sheets

QUICK LOCK

FIELD OF THE INVENTION

The present invention relates to locks and more particularly to a quick lock with improved characteristics.

BACKGROUND OF THE INVENTION

A conventional fastening device (e.g., bolt) 90 for frequently fastening/unfastening two work pieces 80 is shown in FIG. 1. It is well known that work pieces 80 may be replaced or adjusted by fastening and/or unfastening the bolt 90. But this is unsatisfactory for the purpose for which the invention is concerned because the time required for fastening/unfastening is relatively long. Further, it is tedious in operation. Furthermore, the theftproof mechanism is not well. Thus improvement exists.

SUMMARY OF THE INVENTION

It is an object of the present invention to provide a lock which is quick in operation and the theft-proof mechanism is enhanced.

To achieve the above and other objects, the present invention provides a lock for fastening/unfastening an first work piece having a slot on one end and a through hole adjacent the slot and a second work piece having a threaded hole. The lock comprises a lock shell including an axial through hole, a radial through hole in communication with the axial through hole, and a threaded section on the inner surface in the lower portion of the radial through hole; a handle mechanism including a recess in the lower portion for pivotably receiving the lock shell, a handle on the top, an arcuate groove in the bottom in communication with the recess, a hole on one side in communication with the radial through hole and the recess, an aperture on the other side, and a pin fixed in the aperture; an adjusting bar slidingly disposed in the radial through hole, the adjusting bar including an upper end, a lower end, and an annular groove between the upper and the lower ends; a lock body secured in the axial through hole, the lock body including a keyhole on one end, a rotatable lock mechanism on the other end, and a rotatable stud on the lock mechanism capable of being activated to move into or retract from the annular groove; and a cylinder including an upper threaded section threadedly secured to the threaded section of the lock shell, a spaced lower threaded section passed through the slot to be threadedly secured to the threaded hole of the second work piece, and a top hole for receiving the lower end of adjusting bar. In fastening the work pieces together, the lock mechanism and the stud are rotated by the turning keyhole for causing the stud to move into engagement with the annular groove of the adjusting bar for lowering the adjusting bar, the upper end of the adjusting bar is moved into the radial through hole of the lock shell for permitting the handle mechanism to pivot about the lock shell in a first direction until the pin is moved into the through hole of the first work piece, the stud is rotated to hoist the adjusting bar until the upper end of the adjusting bar is passed through the radial through hole of the lock shell to be in the hole of the handle mechanism, the stud is rotated to lower the adjusting bar until the upper end of the adjusting bar is cleared from the hole of the handle mechanism to be in the radial through hole of the lock shell. In unfastening the work pieces, pivot the handle mechanism about the lock shell in a second direction opposite to the first direction until the pin is cleared from the through hole of the first work piece and disengage the cylinder from the slot of the first work piece.

The above and other objects, features and advantages of the present invention will become apparent from the following detailed description taken with the accompanying drawings.

DETAILED DESCRIPTION OF THE PREFERRED EMBODIMENTS

Figure 1:
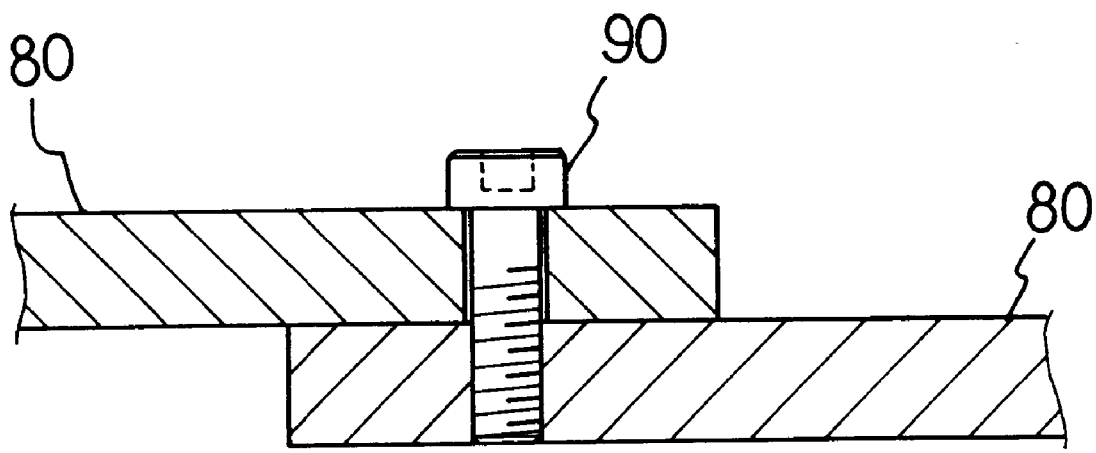
FIG. 1 is a cross-sectional view of a conventional bolt for frequently fastening/unfastening two work pieces.
Figure 2:
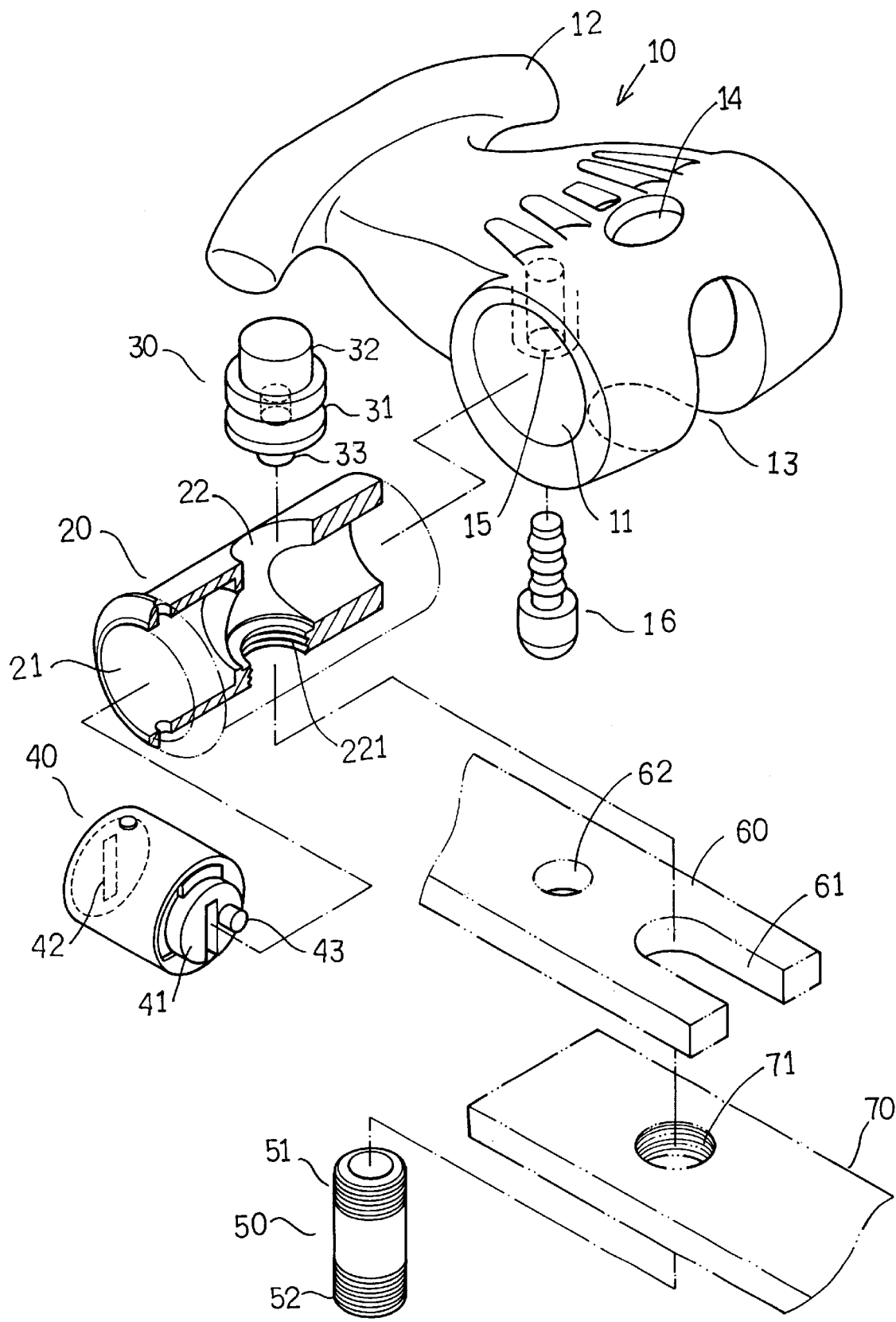
FIG. 2 is a exploded view of a quick lock according to the invention.

Referring to FIGS. 2 to 5, there is shown a lock constructed in accordance with the invention for effecting a quick fastening/unfastening of upper work piece 60 and lower work piece 70. The lock comprises a handle mechanism 10, a lock shell 20, an adjusting bar 30, a lock body 40, and a cylinder 50. Each of above components will now be described as follows: Lock shell 20 comprises an axial through hole 21, a radial through hole 22 in communication with through hole 21, and a threaded section 221 on the inner surface in the lower portion of through hole 22. Handle mechanism 10 comprises a recess 11 in the lower portion for pivotably receiving lock shell 20, a handle 12 on the top, an arcuate groove 13 in the bottom in communication with recess 11, a hole 14 on one side in communication with through hole 22 and recess 11, an aperture 15 on the other side, and a pin 16 fixed in the aperture 15. Adjusting bar 30 is slidingly disposed in through hole 22 and comprises an upper end 32, a lower end 33, and an annular groove 31 between the ends 32 and 33. Lock body 40 is secured in the through hole 21 and comprises a keyhole 42 on one end, a rotatable lock mechanism 41 on the other end, and a rotatable stud 43 on the lock mechanism 41 capable of being activated to move into the groove 31 and retract from the groove 31. Cylinder 50 comprises an upper threaded section 51 threadedly secured to threaded section 221 of lock shell 20, a spaced lower threaded section 52, and a top hole for receiving lower end 33 of adjusting bar 30. Upper work piece 60 comprises a slot 61 on one end and a through hole 62 adjacent the slot 61. Lower work piece 70 has a threaded hole 71 threadedly secured to lower threaded section 52 of cylinder 50 which passes through slot 61.

Figure 3:
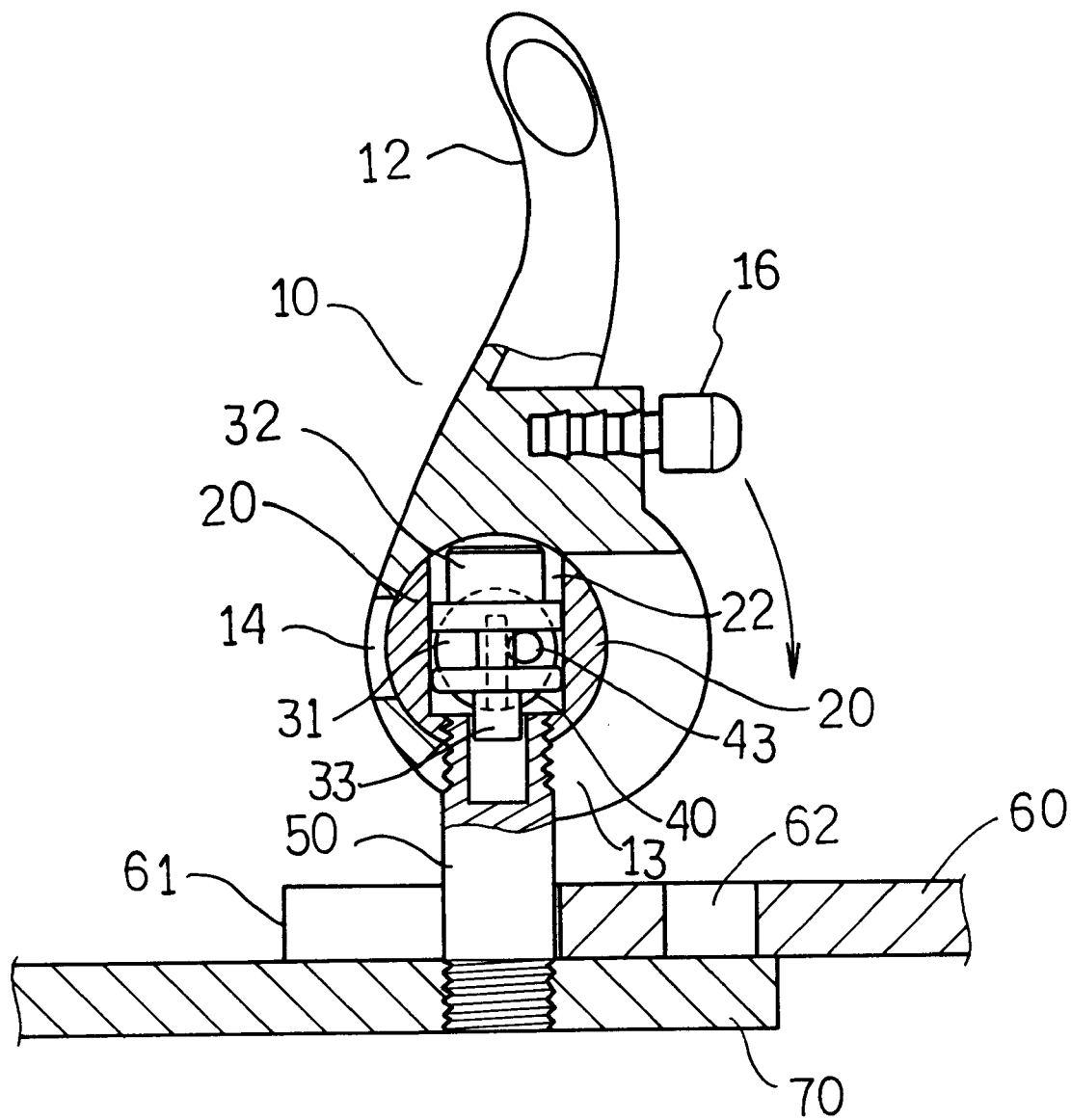
FIG. 3 is a side view in part section for illustrating the unlocked state of the FIG. 2 lock.
Figure 4:
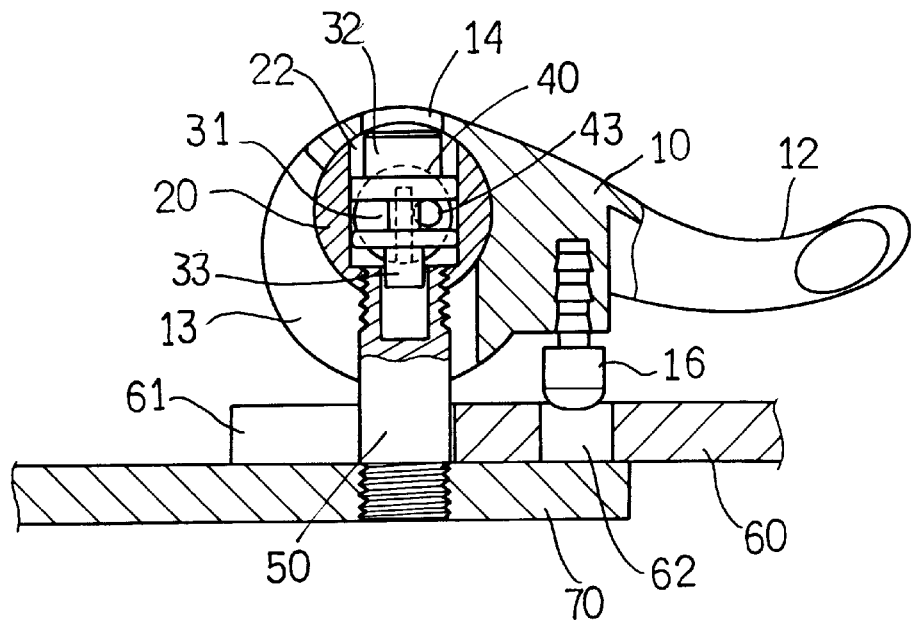
FIG. 4 is a view similar to FIG. 3 wherein the FIG. 2 lock is during a locking process.
Figure 5:
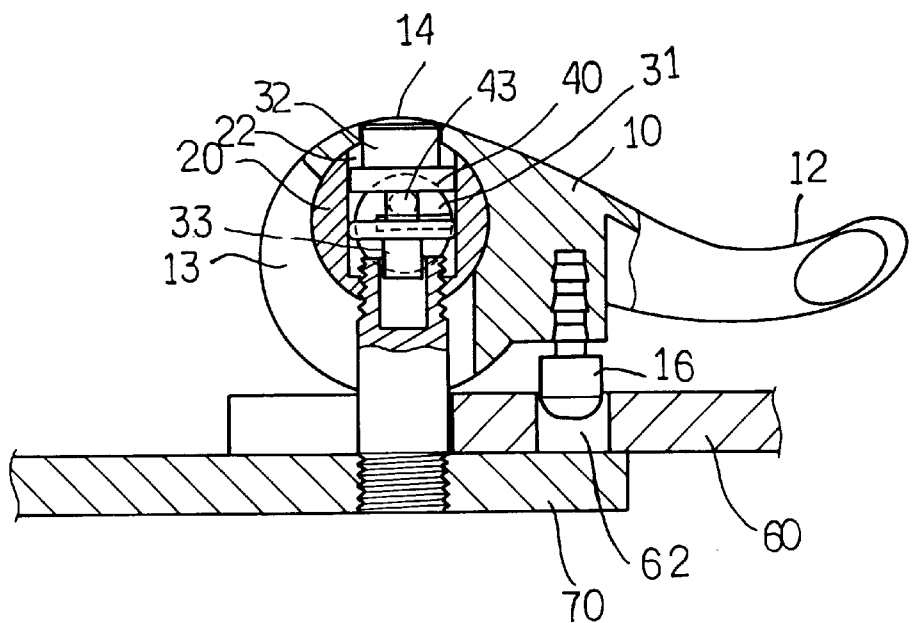
FIG. 5 is a view similar to FIG. 3 wherein the FIG. 2 lock is locked.

In the operation of fastening work pieces 60 and 70 together, first insert a key into keyhole 42 to turn lock mechanism 41 and stud 43. Then stud 43 is actuated to move into engagement with groove 31 of adjusting bar 30 for limitedly hoisting or lowering the adjusting bar 30 as detailed below. When adjusting bar 30 is lowered, upper end 32 is moved into through hole 22 of lock shell 20. As such, handle mechanism 10 is permitted to pivot about lock shell 20. Then push handle mechanism 10 clockwise (as seen in FIG. 3) until pin 16 is moved into through hole 62 of upper work piece 60. Then turn key to cause stud 43 to hoist adjusting bar 30 until upper end 32 is passed through the through hole 22 of lock shell 20 to be in the hole 14 of handle mechanism 10. At this position, handle mechanism 10 is locked (FIG. 5). Thereafter, turn key again to cause stud 43 to lower the adjusting bar 30 until upper end 32 is cleared from hole 14 of handle mechanism 10 to be in through hole 22 of lock shell 20. At this position, handle mechanism 10 is unlocked (FIG. 4). As to the operation of unfastening work pieces 60 and 70, pull handle mechanism 10 counterclockwise (opposite to the arrow shown in FIG. 3) until pin 16 is cleared from through hole 62 of upper work piece 60 (FIG. 3). Then it is possible to disengage cylinder 50 from slot 61 for removing upper work piece 60 from lower work piece 70.

While the invention herein disclosed has been described by means of specific embodiments, numerous modifications and variations could be made thereto by those skilled in the art without departing from the scope and spirit of the invention set forth in the claims.

What is claimed is:

1. A lock for fastening/unfastening a first work piece having a slot on one end and a through hole adjacent the slot and a second work piece having a threaded hole comprising:

a lock shell including an axial through hole, a radial through hole in communication with the axial through hole, and a threaded section on an inner surface of a lower portion of the radial through hole;

a handle mechanism including a recess in a lower portion thereof for pivotably receiving the lock shell, a handle on a top portion of the handle mechanism, an arcuate groove in a bottom portion of the handle mechanism in communication with the recess, a hole on one side in communication with the radial through hole and the recess, an aperture on the other side, and a pin fixed in the aperture;

an adjusting bar slidingly disposed in the radial through hole, the adjusting bar including an upper end, a lower end, and an annular groove between the upper and the lower ends;

a lock body secured in the axial through hole, the lock body including a keyhole on one end, a rotatable lock mechanism on the other end, and a rotatable stud on the lock mechanism capable of being activated to move into or retract from the annular groove; and a cylinder including an upper threaded section threadedly secured to the threaded section of the lock shell, a spaced lower threaded section passed through the slot to be threadedly secured to the threaded hole of the second work piece, and a top hole for receiving the lower end of the adjusting bar, wherein in fastening the work pieces together, the lock mechanism and the stud are rotated by turning the keyhole for causing the stud to move into engagement with the annular groove of the adjusting bar for lowering the adjusting bar, the upper end of the adjusting bar is moved into the radial through hole of the lock shell for permitting the handle mechanism to pivot about the lock shell in a first direction until the pin is moved into the through hole of the first work piece, the stud is rotated to hoist the adjusting bar until the upper end of the adjusting bar is passed through the radial through hole of the lock shell to be in the hole of the handle mechanism, the stud is rotated to lower the adjusting bar until the upper end of the adjusting bar is cleared from the hole of the handle mechanism to be in the radial through hole of the lock shell; and in unfastening the work pieces, pivot the handle mechanism about the lock shell in a second direction opposite to the first direction until the pin is cleared from the through hole of the first work piece and disengage the cylinder from the slot of the first work piece.

* * * * *